United States Patent [19]
Mudsam et al.

[11] 3,780,266
[45] Dec. 18, 1973

[54] APPARATUS FOR SCANNING SIGNALS

[75] Inventors: Udo Mudsam, Konstanz; Ernst Reuter, Allensbach; Stefan Maslowski, Aufheim, all of Germany

[73] Assignee: Licentia Patent-Verwaltungs-G.m.b.H., Frankfurt am Main, Germany

[22] Filed: Feb. 23, 1972

[21] Appl. No.: 228,548

[30] Foreign Application Priority Data

Feb. 25, 1971 Germany .................. P 21 08 837.9

[52] U.S. Cl.... 235/61.11 D, 235/154, 340/174.1 H, 340/174.1 G

[51] Int. Cl. .......................... G06k 5/04, G06k 7/08

[58] Field of Search ..................... 235/61.11 D, 154; 340/174.1 A, 174.1 G

[56] References Cited

UNITED STATES PATENTS 3,188,648 6/1965 Cecil ........................... 340/174.1 G
3,702,996 11/1972 Wolfer ......................... 340/174.1 H
3,593,006 7/1971 McGee ........................... 235/92 PK

*Primary Examiner*—Maynard R. Wilbur
*Assistant Examiner*—Robert F. Gnuse
*Attorney*—George H. Spencer et al.

[57] ABSTRACT

An apparatus for scanning signals along at least one track includes signal pickup device which is not guided on the track. The track may be subjected to transverse displacements relative to the pickup device. The pickup device is a plurality of signal sensors arranged in a row transverse to the track for scanning the track to detect information signals from the track. The number of sensors is selected so that at least one of the sensors detects the information signals during all transverse displacements and at least one other of the sensors is in a zone immediately adjacent the track. A selector circuit which is responsive to signals from all of the sensors is arranged to pass information signals from the sensors to a disjunctive circuit.

10 Claims, 1 Drawing Figure

PATENTED DEC 18 1973 3,780,266
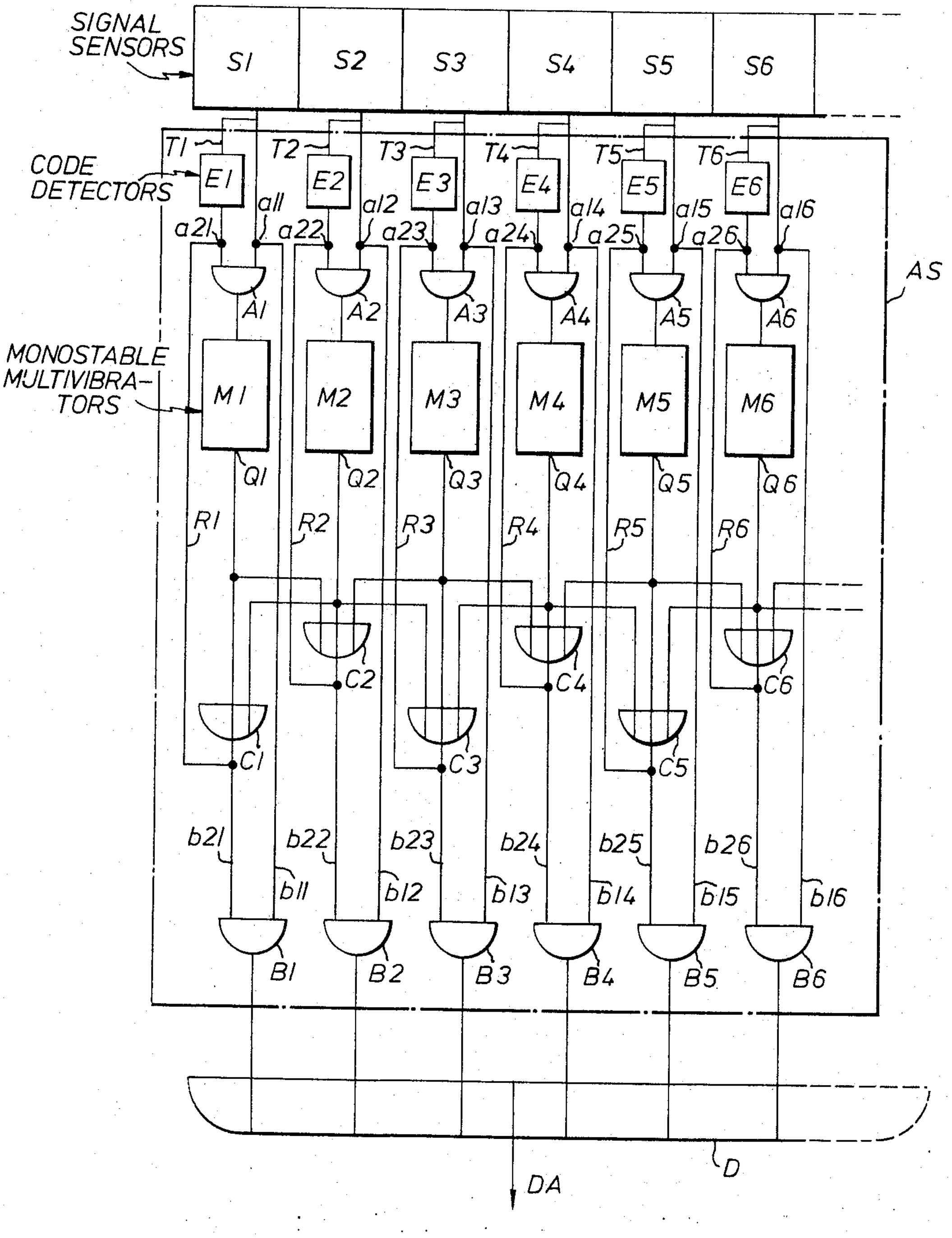

APPARATUS FOR SCANNING SIGNALS

BACKGROUND OF THE INVENTION

This invention relates to an apparatus for scanning signals along at least one track. The present invention relates, more particularly, to an apparatus having a non-trackguided pick-up device for scanning signals along at least one track which also experiences transverse displacements relative to the pickup device.

In scanning signals along a track or simultaneously along a plurality of parallel tracks there exists the requirement of producing an uninterfered-with, uninterrupted signal scanning in spite of the occurrence of transverse shifts of the track(s) or the scanning device, with respect to each other, which are almost always unavoidable particularly in the form of interfering deflections.

In addition to the well-known method of guiding a pickup device mechanically in a track groove, it is also known to keep a scanning beam in a track by means of the scanned track signals which act on beam deflection devices in the sense of a track guidance. It is also known to align a beam on the beginning of a track by means of a special marker. The also known and often employed use of unguided scanning devices (as for example magnetic heads) requires measures for quite precise guidance or positioning of the track carrier and/or the scanning device in order to keep the mutual lateral deflections in a permissible tolerance range. With the use of closely adjacent tracks, the assurance of an adapted tolerance range becomes particularly difficult or impossible.

SUMMARY OF THE INVENTION

It is an object of the present invention to solve the above-mentioned problem in an improved manner which eliminates high expenditures for track guidance.

It is another object of the present invention to avoid the above-mentioned tolerance requirements.

It is a further object of the present invention in an apparatus for scanning signals to provide an arrangement which permits substantial transverse deflections of the track with respect to the pickup device without signal interruption.

The foregoing objects, as well as others which will become apparent from the text which follows, are achieved by providing an apparatus for scanning signals along at least one signal track which apparatus includes a signal pickup device which is not guided on the track and which track may be subjected to transverse displacements relative to the pickup device. The pickup device is a plurality of signal sensors arranged in a row transverse to the track for scanning the track to detect information signals from the track. The number of sensors is selected such that at least one of the sensors detects the information signals during all transverse displacements and at least one of the sensors is positioned in a zone immediately adjacent the track during all transverse displacements. A selector circuit which is responsive to signals from the sensors is arranged to pass information signals from the sensors to a disjunctive circuit.

The present invention also permits in a reliable and simple manner the selection of one or more tracks for signal scanning.

The possibility is also given to amplify the signals of a track by parallel scanning.

According to a feature of the present invention, a series of sensors are arranged transverse to the track in such a manner that the signals of the track are detected by at least one sensor for all transverse displacements. In the zone which is immediately adjacent the track width furnishing the signals, at least one sensor is not charged by or supplied with the signals. Readout signals from all sensors are obtained via at least one disjunction (OR) circuit to which a selector circuit is connected. The selector circuit includes a separate sensor signal recognition circuit for each sensor. Each sensor signal recognition circuit can be enabled by an enabling signal and whose recognition signal switches its associated sensor to a disjunction (OR) circuit and also becomes effective as an enabling signal for the sensor signal recognition circuit of an adjacent sensor which is not charged by readout signals.

Devices are provided in particular to feed an initial enabling signal to at least one of the sensor signal recognition circuits.

Advisably it can further be provided that the recognition signal from a sensor signal recognition circuit actuates a holding circuit which enables this particular sensor signal circuit for a given time interval.

For the simultaneous scanning of a plurality of tracks it is provided that selector circuits each having connected thereto a disjunction circuit are connected in parallel to the sensors of the series.

The arrangement of sensors may be such that a plurality of sensors scan the same track.

A preferred embodiment of the present invention is characterized in that each sensor is connected to a first input of a first AND gate and to a first input of a second AND gate, the output of the first AND gate being connected to the flip input of a monostable multivibrator circuit. The output of the second AND gate is connected to an input of an OR gate. The signal output of the monostable multivibrator circuit and the corresponding signal output associated with an adjacent sensor each are connected to respective inputs of an OR gate. The output of this OR gate is connected with the second input of the first AND gate and with the second input of the second AND gate.

It is further provided that a signal generator or the like for producing an initial activation signal is connected to at least one of the inputs of the first AND gate.

Signal code detectors for producing the initial signal may be provided which are connected to the sensors and which can be selectively switched on.

BRIEF DESCRIPTION OF THE DRAWING

The sole FIGURE of the drawing is a block diagram of an illustrative embodiment of a circuit arrangement in an apparatus for scanning signals according to the present invention.

DETAILED DESCRIPTION OF THE PREFERRED EMBODIMENT

In the drawing, S1 to S6 are diagrammatically represented track signal sensors which are aligned in a row perpendicular to the direction of the track. The row of track signal sensors S1 to S6 and associated devices may be extended, for example, toward the right, as desired. The track signals are assumed to be bit signals which are converted, for example, into positive bit pulses by the signal sensors S1–S6. The signal output of each sensor S$n$ ($n$ = 1 . . . 6 in the drawing) is connected with an input a1$n$ of a respective AND gate An, AND gates A1–A6 being shown, and with an input b1n of a respective AND gate B$n$, AND gates B1–B6 being shown. The outputs of all AND gates B$n$, are connected to a respective input of an OR gate D having an output DA. Each AND gate AN has its output connected to the flip input of a respective monostable multivibrator circuit M$n$, monostable multivibrator M1–M6 being shown. The signal output Q$n$ of each monostable multivibrator circuit M$n$ is connected with one input of a respective OR gate C$n$, OR gates C1–C6 being shown. A further input of each OR gate C$n$ is connected respectively with the putput Q$n$–1 or Q$n$+1, respectively, which is associated with an immediately adjacent sensor of the sensors S1–S6. The output of each OR gate C$n$ is connected with an input b2$n$ of a respective AND gate B$n$ and, via a line R$n$, with an input a2$n$ of a respective AND gate A$n$. A signal generator E$n$, E1–E6 being shown, for providing gate enabling signal is further connected to each input a2$n$ of the respective AND gates A1–A6. The signal generators E1–E6 are e.g. code detectors having their inputs respectively connected to the sensors S1–S6, via lines T1–T6, for detecting a track recognition code which precedes the track information.

The circuit portions contained in the dot-dash frame constitute a selection circuit AS with the function of making selectively effective the sensors S1–S6 which receive or are to receive the signals of a certain track. For the operation of the selector circuit AS it is a prerequisite that the signals of the track are detected by at least one sensor S$n$ for all transverse displacements and that at least one other sensor S$n$ is disposed immediately adjacent a sensor or a group of the sensors S1–S6 receiving the signals from an individual track which other sensor S$n$ does not receive any track signals. With multiple track scanning there must thus exist an appropriate spacing between the individual tracks. The second-mentioned prerequisite is given, for example, in optically scanning densely packed tracks by optical enlargement of the track region to be scanned.

If a sensor signal (bit pulse) from a sensor S$n$ reaches the input a1n of an AND gate A$n$ enabled by the activation of input a2$n$ (i.e. sensitized or released), the associated monostable multivibrator circuit M$n$ is flipped into its astable state. All of the monostable multivibrator circuits M$n$ are made to be "extendable", i.e. each flip pulse arriving during the astable state of one of the multivibrators M$n$ extends the duration of the astable state by the time period of the multivibrator circuit. The time period is so selected that it is longer than the longest interval between the sensor signals (bit pulses) forming the information to be read. The astable state of the multivibrator circuit M$n$ under consideration thus continues as long as information is being read by an associated sensor S$n$. The astable state of the multivibrator circuit M$n$ produces an indicator signal at the respective signal output Q$n$ which signal passes through an associated OR gate C$n$ to the input b2$n$ of an associated AND gate B$n$ and enables it so that it can switch the sensor signals fed to the input b1$n$ through to the OR gate D and thus to the output DA of the OR gate D. Moreover, the indicator signal is fed to the input a2$n$ of an associated AND gate A$n$ via an associated line R$n$ and maintains, during its duration, the activation of this input, thus enabling the associated AND gate A$n$.

Furthermore, the indicator signal from the signal output Q$n$ also reaches an input of the OR gates C$n$+1 and C$n$–1, and thus, via associated lines R$n$+1 and R$n$–1 from the OR gates C$n$+1 and C$n$–1, also reaches or is fed to the inputs a2$n$+1 and a2$n$–1 of the AND gates A$n$+1 and A$n$–1, respectively, and enables them. If, for example, the sensor S$n$–1 is also receiving or being supplied with track signals these can only be, according to the given prerequisites, signals from the same track being received or detected by the sensor S$n$. Signal output Q$n$–1 then also provides an indicator signal which is fed to the OR gate C$n$, the input a2$n$–1 and to an input of the OR gate C$n$–2. Sensor S$n$–1 is then also switched to the output DA, and the AND gate A$n$–2 is enabled. When the sensors S$n$+1 and S$n$–2 are not provided with track signals, the signal outputs Q$n$+1 and Q$n$–2 do not provide an indicator signal. However, as soon as the sensor S$n$+1 or S$n$–2, respectively, is supplied with or begins to receive a signal from the track under consideration because of a transverse displacement in the one or the other direction, this signal produces the indicator signal at the signal output Q$n$+1 or Q$n$–2, respectively, via the enabled AND gate A$n$+1 or A$n$–2, respectively, so that the sensor S$n$+1 or S$n$–2, respectively, is switched through and the AND gate A$n$+2 or A$n$–3, respectively, is enabled.

The switching through of $m$ sensors for detecting signals from the same track as well as the preparation for switching of the immediately adjacent sensors thus moves on correspondingly when there are transverse displacements of the track whereby as can be easily seen, $m$ may also be equal to 1 or be greater than 2. With the scanning of a track ($m$ greater than 1) in groups a signal amplification is obtained.

According to the first above-mentioned prerequisite, the transverse displacements must, of course, not cause the track being read to pass out of the scanning range of the sensors S1–S6 which are interrogated by the above-described selector circuit AS. The row of sensors S1–S6, which may consist, for example, of closely adjacent light signal transducers such as photodiodes for the optical scanning of a possibly enlarged track region can be made as long as desired by providing additional sensors adapted to the maximum transverse displacements to be expected.

The above description of the operation of selector circuit AS was based on the initial situation that an AND gate A$n$ is enabled by a signal at its input a2$n$ and receives track signals at its input A1$n$ from a sensor S$n$. If no sensitizing signal is present at its input a2$n$, the arrival of track signals at input a1n will not produce an indicator signal in the associated signal output Q$n$, i.e. the track signals will not be switched through. Thus a passing, information carrying track can either be ignored or "picked up" by an initial signal. Such a pickup can be effected in a number of different ways. Care can be taken, for example, that during or until the occurrence of a first information signal from a track with an unknown transverse position an enabling signal is fed to all of the inputs a2$n$. Another possible arrangement provides that a sequence of bits preceeding the information bits is provided in the track during whose passage an initial signal is given to all inputs a2$n$. Another possibility is, for example, to feed to both the inputs a1n and a2$n$ an initial sequence of pulses whose time interval is shorter than the time period of the monostable multivibrator circuits M1–M6 until the first track information pulse arrives. A preferred solution is to precede the track information by a track recognition code and to connect an activatable code detector E$n$, as illustrated in the drawing, directly to each sensor S$n$ which code detector E$n$ acts as the initial signal generator and activates the associated input $a2n$ when it recognizes the above-mentioned code if the detector itself is activated, for example by closing a switch behind its output.

For the simultaneous reading of a plurality of tracks running in the same direction it is of course possible, if these tracks are situated far enough apart, to associate a separate row of sensors S1–S6 to each track to which a selector circuit AS with a subsequent OR gate D is connected.

However it is provided, for the multiple track reading of closely adjacent tracks, that only one closed row of sensors S$n$ is provided which meets the two above-mentioned requirements and over which the tape formed by the tracks to be read can play during transverse displacements. If a maximum of $r$ tracks is to be read in such a case, $r$ selector circuits AS with an associated OR gate, corresponding to OR gate D, connected to each of them are then connected in parallel to the outputs of the sensors or to the sensors of overlapping partial sections of the row of sensors which can each be covered in a transverse direction by one track. The second requirement mentioned above then takes care that no "crosstalk" will take place between the adjacent tracks. The switching through of the signals from a certain track $x$ ($x = 1 \ldots r$) to only the OR gate D$x$ associated to this track presupposed of course that this track is enabled only in the selector circuit AS$x$ connected ahead of this particular OR gate D$x$. This can be realized, for example, when the above-mentioned track detection method is used where the track is identified by a starting code which sensitizes the A$n$ gate associated to the charged sensor S$n$ in that each track of the plurality of tracks has a different starting code associated with it and the code detectors E$n$ of the selector circuit AS$x$ associated with a certain track $x$ which detectors are provided to furnish the initial signal are adapted to the code of this track. By adding or not adding an initial signal to the selector circuit AS$x$, particularly by activation or disconnection of the particular code detectors associated with AS$x$, each track of the plurality of tracks can be selectively picked up for the obtaining of information or it can be ignored.

It will be understood that the above description of the present invention is susceptible to various modifications, changes and adaptations, and the same are intended to be comprehended within the meaning and range of equivalents of the appended claims.

We claim:

1. In an apparatus for scanning signals along at least one signal track, the apparatus including signal pickup means not guided on the track which may be subjected to transverse displacements relative to the pickup means, the improvement wherein said pickup means comprises a plurality of signal sensors arranged in a row transverse to the track for scanning the track to detect information signals from the track, the number of said sensors being such that at least one of said plurality of sensors detects the information signals from the track during all expected transverse displacements and at least one other sensor of said plurality of sensors is in a zone immediately adjacent the track, which zone furnishes no information signals during scanning; and further comprising a disjunctive circuit, and selector circuit means responsive to signals from said plurality of sensors for passing information signals from said sensors to said disjunctive circuit, said selector circuit means including: a separate sensor signal recognition circuit means, having an enabling input means, operatively associated with each respective signal sensor for developing a respective recognition signal in response to information signals detected by the respective signal sensor and effecting the passing of the information signals from its associated signal sensor to said disjunctive circuit, each of said separate sensor signal recognition means having means for coupling the respective recognition signal produced by each of said separate signal recognition circuit means to said enabling input means thereof; and means for coupling the respective recognition signal produced by each of said separate sensor signal recognition circuit means to the enabling input means of the separate sensor signal recognition circuit means associated with the adjacent signal sensors of said plurality of signal sensors.

2. An arrangement as defined in claim 1 further comprising means for supplying an initial enabling signal to said enabling input means of at least one of said sensor signal recognition circuit means.

3. An arrangement as defined in claim 1 further comprising at least one additional disjunctive circuit and at least one additional of said selector circuit means, said additional selector circuit means being responsive to information signals from said plurality of signal sensors for passing information signals to said at least one additional disjunctive circuit, whereby a plurality of tracks may be simultaneously scanned with the same plurality of signal sensors.

4. An arrangement as defined in claim 1 wherein said plurality of sensors are operatively arranged so that at least more than one sensor of said plurality of sensors scans a single track.

5. In an apparatus for scanning signals along at least one signal track, the apparatus including signal pickup means not guided on the track which may be subjected to transverse displacements relative to the pickup means, the improvement wherein said pickup means comprises a plurality of signal sensors arranged in a row transverse to the track for scanning the track to detect information signals from the track, the number of said sensors being such that at least one of said plurality of sensors detects the information signals from the track during all exected transverse displacements and at least one other sensor of said plurality of sensors is in a zone immediately adjacent the track, which zone furnishes no information signals during scanning; and further comprising: a disjunctive circuit; selector circuit means responsive to signals from said plurality of sensors for passing information signals from said sensors to said disjunctive circuit, said selector circuit means including a separate sensor signal recognition circuit means, having an enabling input means, operatively associated with each respective signal sensor for developing a respective recognition signal in response to information signals detected by the respective signal sensor and effecting the passing of the information signals from its associated signal sensor to said disjunctive circuit, and means for coupling the respective recognition signal produced by each of said separate sensor signal recognition circuit means to the enabling input means of the separate sensor signal recognition circuit means associated with the adjacent signal sensors of said plurality of signal sensors; and means for supplying an initial enabling signal to said enabling input means of at least one of said sensor signal recognition circuit means.

6. An arrangement as defined in claim 5 wherein said means for supplying an initial enabling signal to said enabling input means of at least one of said sensor signal recognition circuit means comprises a plurality of code detectors coupled to outputs from respective signal sensors of said plurality of signal sensors and responsive to track identifying signals sensed by said respective signal sensors for developing respective initial enabling signals and supplying them to respective said enabling input means of said separate sensor signal recognition circuit means.

7. In an apparatus for scanning signals along at least one signal track, the apparatus including signal pickup means not guided on the track which may be subjected to transverse displacements relative to the pickup means, the improvement wherein said pickup means comprises a plurality of signal sensors arranged in a row transverse to the track for scanning the track to detect information signals from the track, the number of said sensors being such that at least one of said plurality of sensors detects the information signals from the track during all expected transverse displacements and at least one other sensor of said plurality of sensors is in a zone immediately adjacent to the track, which zone furnishes no information signals during scanning; and further comprising: a disjunctive circuit; selector circuit means responsive to signals from said plurality of sensors for passing information signals from said sensors to said disjunctive circuit, said selector circuit means including a separate sensor signal recognition circuit means, having an enabling input means, operatively associated with each respective signal sensor for developing a respective recognition signal in response to information signals detected by the respective signal sensor and effecting the passing of the information signals from its associated signal sensor to said disjunctive circuit, and means for coupling the respective recognition signal produced by each of said separate sensor signal recognition circuit means to the enabling input means of the separate sensor signal recognition circuit means associated with the adjacent signal sensors of said plurality of signal sensors; and at least one additional disjunctive circuit and at least one additional of said selector circuit means, said additional selector circuit means being responsive to information signals from said plurality of signal sensors for passing information signals to said at least one additional disjunctive circuit, whereby a plurality of tracks may be simultaneously scanned with the same plurality of signal sensors.

8. In an apparatus for scanning signals along at least one signal track, the apparatus including signal pickup means not guided on the track which may be subjected to transverse displacements relative to the pickup means, the improvement wherein said pickup means comprises a plurality of signal sensors arranged in a row transverse to the track for scanning the track to detect information signals from the track, the number of said sensors being such that at least one of said plurality of sensors detects the information signals from the track during all expected transverse displacements and at least one other sensor of said plurality of sensors is in a zone immediately adjacent the track which zone furnishes no information signals during scanning, said plurality of sensors being operatively arranged so that more than one sensor of said plurality of sensors scans a single track and further comprising a disjunctive circuit; and selector circuit means responsive to signals from said plurality of sensors for passing information signals from said sensors to said disjunctive circuit, said selector circuit means including a separate sensor signal recognition circuit means, having an enabling input means, operatively associated with each respective signal sensor for developing a respective recognition signal in response to information signals detected by the respective signal sensor and effecting the passing of the information signals from its associated signal sensor to said disjunctive circuit, and means for coupling the respective recognition signal produced by each of said separate sensor signal recognition circuit means to the enabling input means of the separate sensor signal recognition circuit means associated with the adjacent signal sensors of said plurality of signal sensors.

9. In an apparatus for scanning signals along at least one signal track, the apparatus including signal pickup means not guided on the track which may be subjected to transverse displacements relative to the pickup means, the improvement wherein said pickup means comprises a plurality of signal sensors arranged in a row transverse to the track for scanning the track to detect information signals from the track, the number of said sensors being such that at least one of said plurality of sensors detects the information signals from the track during all expected transverse displacements and at least one other sensor of said plurality of sensors is in a zone immediately adjacent the track, which zone furnishes no information signals during scanning; and further comprising a disjunctive circuit and selector circuit means responsive to signals from said plurality of sensors for passing information signals from said sensors to said disjunctive circuit, said selector circuit means comprising: a plurality of first AND gates each having a first input connected to an output from a respective signal sensor of said plurality of signal sensors; a plurality of second AND gates each having a first input connected to an output from a respective signal sensor of said plurality of signal sensors, each of said plurality of second AND gates having its output connected to an input of said disjunctive circuit; a plurality of monostable multivibrators, each having its flip input connected to the output of a respective one of the AND gates of said plurality of first AND gates; a plurality of OR gates, each of said OR gates having a first input connected to the output of a respective one of said monostable multivibrators and at least one further input connected to the output of said plurality of multivibrators associated with signal sensors adjacent to the signal sensor associated with the multivibrator supplying the signal to the first input of the respective OR gate and the output from each of said plurality of OR gates being coupled to a second input of a respective one of the AND gates of said plurality of first AND gates and to a second input of a respective one of the AND gates of said plurality of second AND gates.

10. An arrangement as defined in claim 9 further comprising signal generating means connected to at least one of said second inputs of the AND gates of said plurality of first AND gates for supplying an initial enabling signal thereto.

* * * * *